Sept. 1, 1953  W. R. KING  2,650,693
FLOW CONTROLLER FOR GRANULAR SOLIDS
Filed April 30, 1951  2 Sheets-Sheet 1

INVENTOR.
W. R. KING
BY Hudson & Young
ATTORNEYS

Sept. 1, 1953 W. R. KING 2,650,693
FLOW CONTROLLER FOR GRANULAR SOLIDS
Filed April 30, 1951 2 Sheets-Sheet 2

INVENTOR.
W. R. KING
BY Hudson & Young
ATTORNEYS

Patented Sept. 1, 1953

2,650,693

UNITED STATES PATENT OFFICE 2,650,693

FLOW CONTROLLER FOR GRANULAR SOLIDS

William R. King, Borger, Tex., assignor to Phillips Petroleum Company, a corporation of Delaware Application April 30, 1951, Serial No. 223,757

9 Claims. (Cl. 198—57)

This application relates to flow control means for granular solids. In one aspect it relates to means for controlling the flow or rate of feed of easily breakable carbon black pellets. In another aspect it relates to means for maintaining and controlling the rate of flow of granular solids to a process requiring an exact rate of feed of said solids.

In the prior art of controlling the flow of granular solids it has been difficult to maintain a uniform flow and at the same time to avoid damage to the granular particles. This is especially true in the handling of pelleted carbon black wherein the granular particles, known as pellets, are relatively hard and polished balls of small diameter which flow fairly well but which are quite frangible and break up into dust when their compressive strength is exceeded. A number of different types of flow controllers and valves have been employed in controlling the flow of pellets of carbon black in various carbon black producing processes, and without exception all of these controllers have failed due to breaking the pellets into dust, or due to the scaling tendency of the pellets which tend to plug up the usual orifices, and bridge over small openings, which results in the need for constant attention on the part of the operator in order to maintain the rate of flow at anything approaching a constant volume per unit of time.

When granular materials, such as carbon black pellets, are being supplied to a continuous chemical or mechanical process, it is very important that the rate of supply be maintained very close to the predetermined rate. Otherwise a composition of matter being compounded out of the carbon black as one ingredient and one or more other ingredients would vary in proportions and not conform to the specifications. In the pelleting of carbon black it is often desirable to recycle a portion of the pellets formed in the process and to add the same to the pellet mill along with fresh unpelleted flocculent carbon black to prevent the flocculent black from forming large masses known as scale, or the entire load in the pelleting drum turning to dust. In this recycle it is important that complete pellets are recycled with a minimum of broken pellets or dust, and many flow controllers for granular solids in the prior art break up too large a proportion of the carbon black pellets into dust to be useful in recycling carbon black pellets to a carbon black pelleting process, or gradually reduce the amount of recycle due to progressive plugging as time passes.

The present invention comprises a flow controller for granular solids which is infinitely variable from no flow at all up to the maximum capacity of the conveyor belt, and which will closely maintain the rate of flow for which it is set without breaking up the granular solids, even though they are as fragile as carbon black pellets, or more so, and which will not block up or allow the granular material to bridge over the hopper to change the rate of flow.

One object of the present invention is to provide an improved flow controller for granular solids.

Another object is to provide a flow controller which will not break up fragile granular solids and which will not plug nor change its rate of flow over long periods of time.

Another object is to provide a flow controller which is inexpensive, free from maintenance difficulties, and is rugged and simple in operation.

Numerous other objects and advantages will be apparent to those skilled in the art upon reading the accompanying specification, claims and drawings.

Figure 1:
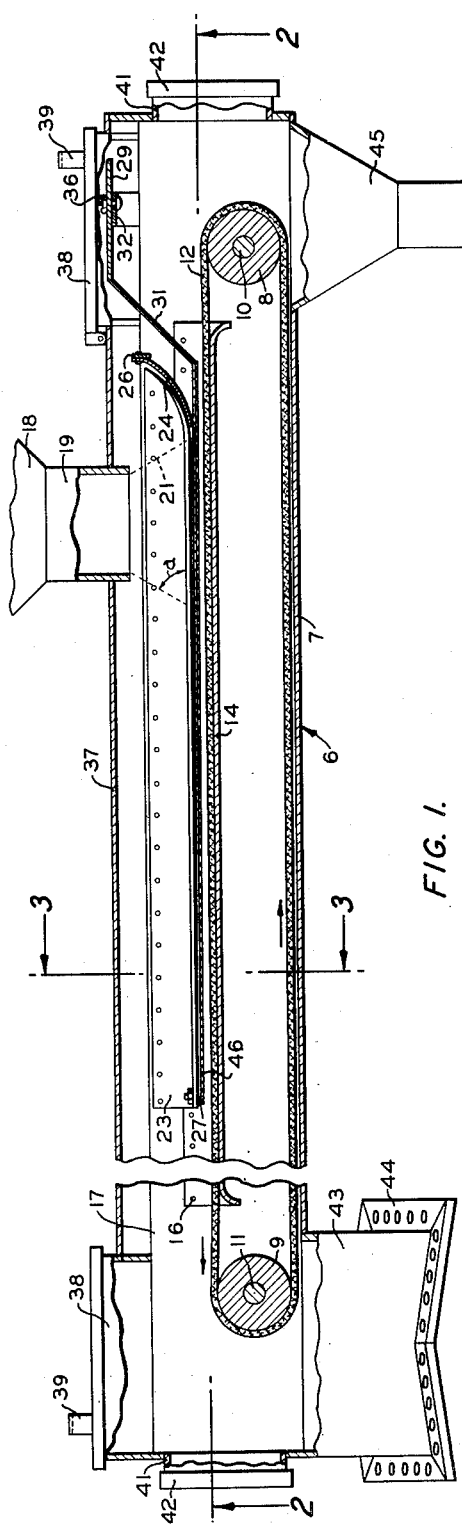
Figure 1 is an illustrative view with parts broken away to show details of construction of a flow controller for granular solids embodying the present invention.
Figure 2:
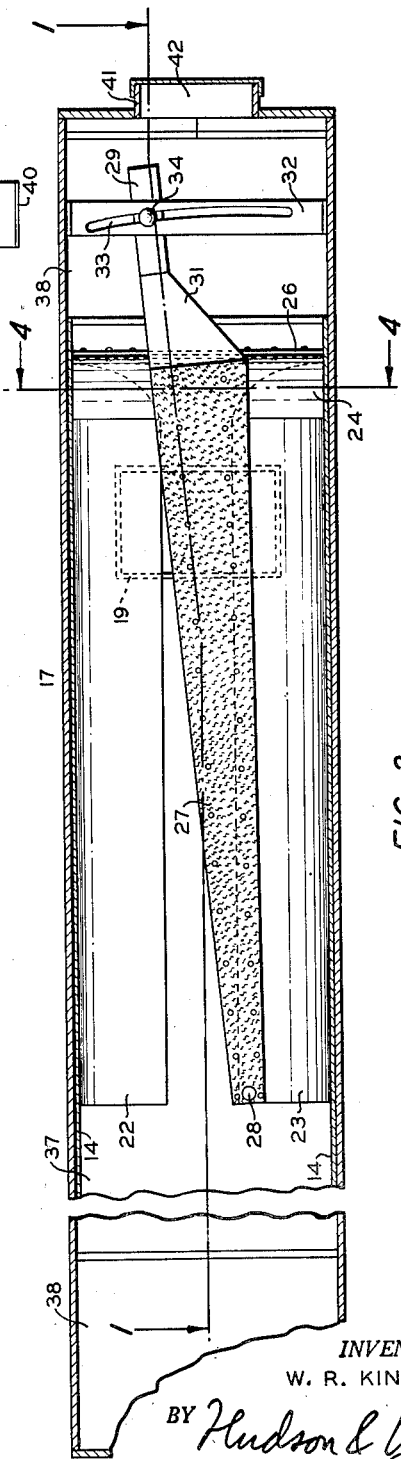
Figure 2 is a cross-sectional view of the device shown in Figure 1 taken along the line 2—2 looking upward in the direction indicated.
Figure 3:
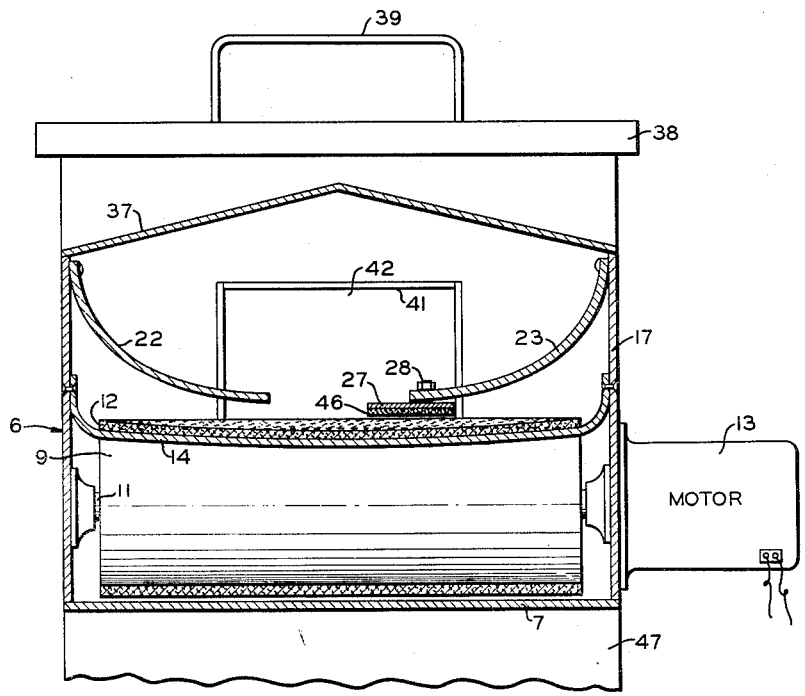
Figure 3 is a cross-sectional view of the device shown in Figure 1 taken along the line 3—3 looking in the direction indicated.

In Figure 1 a flow controller for granular solids, generally designated as 6, comprises in combination a body 7 having a plurality of conventional belt pulleys 8 and 9 rotatably mounted therein and secured thereto by suitable shafts 10 and 11 which may be either separable as shown, or integral with the pulleys, depending on the type of construction preferred. A conveyor belt 12 is disposed on said pulleys and means 13 is provided to move said conveyor consisting of a motor which may be suitably attached to either of shafts 10 or 11. While a motor could be provided for each of pulleys 8 or 9, it is conventional to drive one pulley and have the other be an idler.

The present invention can operate with a belt 12 which may be unsupported between the pulleys 8 and 9. However, it is preferred to support the central portion of the upper half of the belt, especially when the granular solids are heavy, in a supporting member 14 which is secured at its sides by suitable means such as rivets 16 to the walls 17 of the body 7.

A hopper 18 is disposed above a portion of the belt 12, also preferably above said supporting member 14 (when present), and hopper 18 may be any conical or pyramid shaped affair ending with the usual throat 19, or it can be merely a pipe like 19 of a uniform diameter if desired. The granular solids emerging from the hopper throat 19 extend into contact with belt 12 and form a pile thereon having a surface 21 which has a definite angle of repose (a) with the belt depending upon the character of the granular solids. When this angle of repose (a) is large, the hopper throat 19 can be positioned a considerable distance from the belt, but if the materials are very fluid the hopper 19 should be positioned closer to the belt than shown, the proportion shown in the drawing being suitable for pelleted, or semi-pelleted, carbon black.

Flexible guides 22, 23 and 24 are secured by any suitable means to the walls 17 of body 7, and in the case of guide 24 to a cross bar 26 provided for this purpose. The flexible guides are preferably made of belting which will not cause undue abrasion and/or friction when contacting the moving conveyor belt 12, but they may be made of any suitable flexible metallic, or non-metallic material. The flexible guides cover the edges of belt 12 and leave the center exposed. Belt 12 then carries away a portion of the granular material coming down from hopper 19 in between guides 22 and 23.

A valve 27 is pivoted at 28 to one of the guides 23 and can be moved between the belt 12 and guides 22 and 23 to expose a predetermined variable area of said belt between said guides and within the angle of repose of the solids 21 descending through said hopper 19 onto said belt. This exposed area can be varied from zero to substantially the entire area between belt guides 22 and 23 by moving the handle 29 which is the end of the upturned portion of valve 27. If desired this portion 29 may be supported on a cross-member 32 in the body 7 and clamped in position by means of any suitable adjustment means, such as slot 33, bolt 34 and butterfly nut 36.

In conveying many granular materials it is unnecessary to have the belt covered, but with carbon black it is preferred to keep the same under cover, and therefore body 7 may be provided with a cover 37 which may be provided with hatches 38 having handles 39 to provide access to the interior. Similarly hatches 41 provided with covers 42 may be provided where desired. Belt 12 discharges the carbon black through outlet 43 by gravity, and this outlet may be provided with flange 44 of the proper shape to fit on another conveyor housing, 44 being shown shaped to attach to an inclined housing. Dust collecting bin 45 may be provided where desired and the accumulated dust can be periodically removed by removing covering 40.

Figure 4:
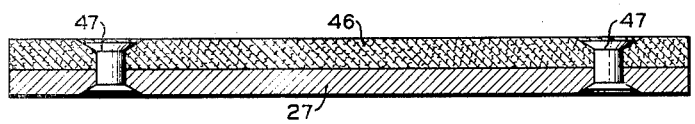
Figure 4 is an enlarged cross-sectional view of the valve alone, taken along the line 4—4 in Figure 2, looking in the direction indicated, showing details of preferred construction.

As shown in Figure 4, the valve 27 is preferably made of sheet metal of a flexible nature with a layer of belting 46 of a material compatible with belt 12 to reduce friction and abrasion resulting in contacting the moving belt 12, and layer 46 is secured to valve 27 by any suitable means such as countersunk rivets 47.

Belt 12, guides 22, 23 and 24 and valve 27 may be any suitable flexible material. While flexible metal may be employed for all these elements, it is preferred to have flexible metal for the top portion of valve 27 only and to employ any suitable belting for the remaining flexible parts. The belting material should be chosen to be compatible with the granular solids and for carbon black I find that rubber is preferred. This rubber belting may be solid rubber or some canvas fabric made of cotton or other suitable fiber coated with rubber or rubbery material. By rubbery material I mean to include any of the compositions now used for making flexible belting, especially conveyor belting.

At the head end, or up-belt end, of guides 22 and 23 is a leading guide 24 which extends from one side of body 7 to the other between the guides 22, 23 and the valve 27. This head guide 24 allows valve 27 to be moved in and out under guide 22 and the movement of belt 12 aids in this adjustment.

*Operation*

In operation, motor 13 rotates driving pulley 9 moving the upper portion of belt 12 from right to left in Figure 1 over support 14 in the direction indicated. Loose granular material, such as pelleted carbon black, is placed in hopper 18 emerging through conduit 19 in a pile on guides 22, 23 and valve 27, which pile is replaced by gravity feed as fast as material is removed therefrom by said belt. As valve 27 is moved by loosening nut 36 and moving handle 29 (accessible through cover 38), a predetermined area of the base of the pile is exposed to the moving belt 12 and the rate at which the granular material is moved by the belt is a function somewhat directly proportional to this area, which area may be increased until it constitutes the entire base of pile 21 between guides 22 and 23, which gives the maximum rate of feed possible.

Once pile 21 has been established the present flow controller is gentle toward the granular material and does not subject the same to any compressive shocks. It should be noted that the area of the base of the pile 21 between valve 27 and guide 22 is in the form of a right triangle having its base in the direction of travel of the belt, so that as the belt moves there is no possibility of any wedging action, but instead the angular space between 22 and 23 is constantly being cleared out in the direction of its greater width. This prevents jamming and bridging, as often occurs in prior flow controllers. Similarly, because of head guide 24 extending across belt 12 below guides 22 and 23 and above valve 27, valve 27 may be moved freely in and out over the corners and edges of guides 22 and 23, and, as this movement is accomplished while the belt is moving (and especially if handle 29 is moved slowly), there is substantially no breaking of pellets, nor any tendency to plug or jam the device when adjusting the rate of feed, which is a common occurrence with the flow controllers of the prior art.

A number of flow controlling devices have been tested for controlling the flow of carbon black pellets in a commercial carbon black plant and only the present invention was successful. All the other hoppers and flow controllers that were tried plugged up and were very troublesome.

*Example*

Actual tests of the illustrative embodiment shown in the drawings have shown it to maintain a rate of 40,000 pounds per day over a period of several months within a range of ±1,000 pounds per day. It is infinitely variable from zero pounds per day to the maximum capacity of the belt.

While an illustrative embodiment of my invention has been shown in the drawings and described in the specification for purpose of illustration, the invention is not limited thereto but is defined by the following claims.

Having described my invention, I claim:

1. A flow controller for granular solids comprising in combination a body, a plurality of pulleys rotatably mounted on said body, a conveyor belt disposed on said pulleys, means to move said conveyor belt, a supporting member secured to said body supporting a portion of said belt, a hopper mounted a predetermined distance above a portion of said belt above said supporting member, flexible guides disposed in said body and secured thereto above said belt covering the edges thereof, and a valve pivoted to one of said guides disposed between said belt and said guide movably to expose a predetermined variable area of said belt within the angle of repose of the solids descending through said hopper onto said belt, so that the solids flowing onto said exposed area will be conveyed away at a rate which is a direct function of the size of said exposed area.

2. A flow controller for granular solids comprising in combination a body, a plurality of pulleys rotatably mounted on said body, a conveyor belt disposed on said pulleys, means to move said conveyor belt, a hopper mounted a predetermined distance above a portion of said belt, flexible guides disposed in said body and secured thereto above said belt covering the edges thereof, and a valve pivoted to one of said guides disposed between said belt and said guide movably to expose a predetermined area of said belt within the angle of repose of the solids descending through said hopper onto said belt, so that the solids flowing onto said exposed area will be conveyed away at a rate which is a direct function of the size of said exposed area.

3. The combination of claim 2 in which the valve is a sheet of flexible material.

4. The combination of claim 3 in which the portion of the valve adjacent said conveyor belt is covered with a layer of belting material to reduce abrasion and friction resulting from said valve contacting said conveyor belt when it is moving.

5. The combination of claim 2 in which the valve is movable to a position completely covering all portions of said belt between said guides and within the angle of repose of said solids descending from said hopper.

6. A flow controller for granular solids comprising in combination a body, a member having a conveying surface mounted for movement in said body, guides covering a portion of said conveying surface and defining an exposed portion of said surface, a valve movable between said guides and said conveying surface to vary the area of said exposed portion in combination with said guides, said valve and guides being so disposed and positioned that said exposed portion is always in the form of an area ever widening in the direction of movement of said conveying surface so that jamming of granular materials placed on said exposed portion by said movement is substantially eliminated.

7. A flow controller for granular solids comprising in combination a body, a member having a conveying surface mounted for movement in said body, side guides secured to said body and having side edges overlapping said member and extending parallel to the direction of movement thereof and spaced on each side thereof, a head guide secured to said body and extending between said member and said side guides and extending under both of said side guides, and a valve movable between said head guide and said member and between said side guides and said member to vary the area of said member exposed between said side guides.

8. The combination of claim 7 in which the valve is pivoted to one of said guide members.

9. The combination of claim 8 in which a slotted bar is secured to said body and the end of said valve opposite said pivot is secured in a selected position to said bar by means engaging in said slot.

WILLIAM R. KING.

References Cited in the file of this patent

UNITED STATES PATENTS

| Number | Name | Date |
|---|---|---|
| 329,787 | Walter | Nov. 3, 1885 |
| 588,715 | Ingraham | Aug. 24, 1897 |
| 2,430,282 | Ensinger | Nov. 4, 1947 |

FOREIGN PATENTS

| Number | Country | Date |
|---|---|---|
| 63,086 | Norway | Dec. 30, 1940 |